(12) United States Patent
Robert et al.

(10) Patent No.: US 6,475,633 B1
(45) Date of Patent: Nov. 5, 2002

(54) COEXTRUSION BINDER BASED ON A MIXTURE OF COGRAFTED POLYOLEFINS

(75) Inventors: Patrice Robert, Beaumont le Roger (FR); Laurent Breysse, Bernay (FR)

(73) Assignee: Elf Atochem, S.A., Puteaux (FR)

( * ) Notice: Subject to any disclaimer, the term of this patent is extended or adjusted under 35 U.S.C. 154(b) by 0 days.

(21) Appl. No.: 09/562,972

(22) Filed: May 3, 2000

Related U.S. Application Data

(63) Continuation of application No. 08/844,367, filed on Apr. 18, 1997, now abandoned.

(30) Foreign Application Priority Data

Apr. 19, 1996 (FR) ............................................. 96 04938

(51) Int. Cl.$^7$ ............................................... B32B 27/08
(52) U.S. Cl. ................... 428/516; 428/476.9; 428/517; 428/522; 525/191; 525/193; 525/194
(58) Field of Search ................................. 525/191, 193, 525/194; 428/414, 476.9, 516, 517, 522

(56) References Cited

U.S. PATENT DOCUMENTS

| | | | |
|---|---|---|---|
| 4,472,555 A | 9/1984 | Schmukler et al. | 525/74 |
| 4,477,532 A | 10/1984 | Schmukler et al. | 428/441 |
| 4,506,056 A * | 3/1985 | Gaylord | 524/445 |
| 5,296,552 A | 3/1994 | Ohmae et al. | 525/193 |
| 5,451,639 A | 9/1995 | Marczinke et al. | 525/193 |
| 5,476,905 A | 12/1995 | Schwager et al. | 525/301 |

FOREIGN PATENT DOCUMENTS

| | | |
|---|---|---|
| EP | 035 392 (A1 and B1 | 9/1981 |
| EP | 188 926 (A1 and B1 | 7/1986 |
| EP | 467 178 (A2 A3 B1 | 1/1992 |
| EP | 501 762 (A1 and B1 | 9/1992 |
| EP | 617 063 | 9/1994 |

OTHER PUBLICATIONS

French Search Report dated Jan. 22, 1997.

* cited by examiner

Primary Examiner—Robert Dawson
Assistant Examiner—D. Aylward
(74) Attorney, Agent, or Firm—Smith, Gambrell & Russell, LLP

(57) ABSTRACT

The invention relates to a mixture which is useful as a coextrusion binder, comprising:

at least (A) one polyethylene or one ethylene copolymer, at least (B) chosen from (B1) polypropylene or a propylene copolymer, (B2) poly(1-butene) homo- or copolymer, and (B3) polystyrene homo- or copolymer, the mixture of (A) and (B) being grafted with a functional monomer, this grafted mixture itself optionally being diluted in at least one polyolefin (C) or in at least one polymer (D) of elastomeric nature or in a mixture of (C) and (D). The invention also relates to polyolefin/binder/polyamide, EVOH, polyester or metal structures. The invention is useful for making packaging.

18 Claims, No Drawings

COEXTRUSION BINDER BASED ON A MIXTURE OF COGRAFTED POLYOLEFINS

This is a continuation of Ser. No. 08/844,367, filed on Apr. 18, 1997, now abandoned.

The present invention relates to a coextrusion binder based on a mixture of cografted polyolefins.

The invention relates more particularly to a mixture, which is useful as a coextrusion binder, of at least (A) one polyethylene or one ethylene copolymer and of at least (B) chosen from (B1) propylene or a propylene copolymer, (B2) poly(1-butene) homo- or copolymer and (B3) polystyrene homo- or copolymer, the mixture of (A) and (B) being grafted with a functional monomer, this grafted mixture itself optionally being diluted in at least one polyolefin (C) or in at least one polymer of elastomeric nature (D) or in a mixture of (C) and (D).

These coextrusion binders are useful, for example, for manufacturing multilayer packaging materials. Mention may be made of materials comprising a polyamide (PA) film and a polyethylene (PE) film, it being possible for the polyethylene film to be laminated on the polyamide film or coextruded with the polyamide. The coextrusion binder is placed between the polyethylene and the polyamide for good adhesion of the PA and of the PE. These multilayer materials may be PE/binder/EVOH three-layer structures in which EVOH denotes a copolymer of ethylene and vinyl alcohol or an ethylene/vinyl acetate (EVA) copolymer which is partly or totally saponified, or PE/binder/EVOH/binder/PE five-layer structures.

The prior art EP 35,392 describes polyethylenes or ethylene copolymers containing at least 85 mol % of ethylene grafted with maleic anhydride. These grafted polyethylenes may then be diluted in polyethylenes or ethylene copolymers containing at least 50 mol % of ethylene, on condition that the mixture contains at least 80 mol % of ethylene. These products are coextrusion binders. The prior art EP 188,926 describes polypropylenes grafted with maleic anhydride, which are useful as coextrusion binders.

The radical grafting of functional monomers onto polyolefins is carried out either in the molten state or in solution, using radical initiators such as peroxides, or in the solid state by irradiation. Under the action of the radicals, side reactions take place at the same time as the grafting reaction. They lead to an increase in the molecular mass when the polymer to be grafted is polyethylene, or to a decrease therein when it is polypropylene. If the amount of radicals required for the grafting reaction is large, the change in molecular mass of the polyolefin leads to a considerable modification of its viscosity in the molten state.

These graftings generally take place in an extruder. The viscosity of the grafted polyethylene is so high that it can no longer be extruded; the viscosity of the grafted polypropylene is so low that it too can no longer be extruded.

These phenomena reduce the amount of reactive functions which can be incorporated onto the polyolefin by radical grafting of functional monomers.

EP 617,063 describes the grafting of mixtures of (i) polypropylene homopolymers or of polypropylene containing a little ethylene and (ii) of ethylene/propylene copolymers which may contain ethylene predominantly. The amount of monomer to be grafted which is added to the mixture of (i) and (ii) is not more than 0.35% by weight of (i) and (ii). The grafted product obtained is not a coextrusion binder, but it is added to polypropylenes loaded with glass fibres.

The aim of the invention is to produce mixtures of (A) and (B) which may contain, for example, 3 to 5% by weight of grafts.

The Applicant has discovered that it is possible to graft large amounts of functional monomer onto mixtures of polyethylene and polypropylene. The increase in molecular mass of the polyethylene is compensated for by the decrease in molecular mass of the polypropylene present during the radical grafting reaction. The Applicant has discovered that it is possible to manufacture them in the molten state with conventional tools for the extrusion or mixing of plastics. The products obtained by this method have a fluidity such that it is possible to use them readily in conventional processes for converting plastics, to mix them homogeneously with other polymers in the molten state, with conventional techniques under usual temperature conditions. In comparison, polyethylenes grafted to the same levels are very viscous and it is not possible to use them under normal conditions of conversion. Furthermore, it is not possible to mix them homogeneously with other polymers in the molten state with common techniques under usual temperature conditions.

The present invention also relates to a multilayer structure composed of a layer comprising the above binder, and directly attached to the latter a layer of nitrogen-containing or oxygen-containing polar resin such as a layer (E) of a polyamide resin, of a saponified copolymer of ethylene and of vinyl acetate, of a polyester resin, of an inorganic oxide deposited on a polymer such as PE, polyethylene terephthalate or EVOH, or alternatively a metal layer.

According to this form, the binder may be used as a protective film.

According to another variant, the invention also relates to the above structure and directly attached to it, on the binder side, a layer (F) based on polyolefin.

As regards the binder of the invention, (A) is chosen from polyethylene homo- or copolymers.

Comonomers which may be mentioned are alpha-olefins, advantageously those having from 3 to 30 carbon atoms.

Examples of alpha-olefins having 3 to 30 carbon atoms as possible comonomers comprise propylene, 1-butene, 1-pentene, 3-methyl-1-butene, 1-hexene, 4 methyl-1-pentene, 3-methyl-1-pentene, 1-octene, 1-decene, 1-dodecene, 1-tetradecene, 1-hexadecene, 1-octadecene, 1-eicocene, 1-docosene, 1-tetracocene, 1-hexacocene, 1-octacocene and 1-triacontene. These alpha-olefins may be used alone or as a mixture of two or more than two.

unsaturated carboxylic acid esters such as, for example, alkyl (meth)acrylates, it being possible for the alkyls to have up to 24 carbon atoms.

Examples of alkyl acrylate or methacrylate are, in particular, methyl methacrylate, ethyl acrylate, n-butyl acrylate, isobutyl acrylate and 2-ethylhexyl acrylate.

vinyl esters of saturated carboxylic acids such as, for example, vinyl acetate or propionate.

unsaturated epoxides.

Examples of unsaturated epoxides are, in particular:

aliphatic glycidyl esters and ethers such as allyl glycidyl ether, vinyl glycidyl ether, glycidyl maleate and itaconate, glycidyl acrylate and methacrylate, and alicyclic glycidyl esters and ethers such as 2-cyclohexene 1-glycidyl ether, cyclohexene-4,5-diglycidyl carboxylate, cyclohexene-4-glycidyl carboxylate, 5-norbornene-2-methyl-2-glycidyl carboxylate and endocisbicyclo(2,2,1)-5-heptene-2, 3-diglycidyl dicarboxylate.

unsaturated carboxylic acids, their salts and their anhydrides.

Examples of unsaturated dicarboxylic acid anhydrides are, in particular, maleic anhydride, itaconic anhydride, citraconic anhydride and. tetrahydrophthalic anhydride.

dienes such as, for example, 1,4-hexadiene.

(A) may comprise several comonomers.

Advantageously, the polymer (A), which may be a mixture of several polymers, comprises at least 50% and preferably 75% (on a molar basis) of ethylene. The density of (A) may be between 0.86 and 0.98 g/cm$^3$. The MFI (viscosity index at 190° C., 2.16 kg) is advantageously between 1 and 1000 g/10 min.

Examples of polymers (A) which may be mentioned are:

low density polyethylene (LDPE)

high density polyethylene (HDPE)

linear low density polyethylene (LLDPE)

very low density polyethylene (VLDPE)

the polyethylene obtained by metallocene catalysis, that is to say the polymers obtained by copolymerization of ethylene and alpha-olefin such as propylene, butene, hexene or octene, in the presence of a monosite catalyst consisting generally of a zirconium or titanium atom and of two cyclic alkyl molecules linked to the metal. More specifically, the metallocene catalysts are usually compounds of two cyclopentadiene rings linked to the metal. These catalysts are often used with aluminoxanes as cocatalysts or activators, preferably methylaluminoxane (MAO). Hafnium may also be used as metal to which the cyclopentadiene is attached. Other metallocenes may include transition metals from groups IV A, V A and VI A. Metals of the lanthanide series may also be used.

EPR (ethylene-propylene-rubber) elastomers

EPDM (ethylene-propylene-diene) elastomers mixtures of polyethylene with an EPR or an EPDM ethylene/alkyl (meth)acrylate copolymers which may contain up to 60% by weight of (meth)acrylate and preferably 2 to 40% ethylene/alkyl (meth)acrylate/maleic anhydride copolymers obtained by copolymerization of the three monomers, the proportions of (meth)acrylate being like the above copolymers, the amount of maleic anhydride being up to 10% and preferably 0.2 to 6% by weight.

ethylene/vinyl acetate/maleic anhydride copolymers obtained by copolymerization of the three monomers, the proportions being the same as in the above copolymer.

As regards (B1), this is a polypropylene homo- or copolymer. Comonomers which may be mentioned are:

alpha-olefins, advantageously those having from 3 to 30 carbon atoms. Examples of such alpha-olefins are the same as for (A) apart from replacing the propylene by ethylene in the list dienes (B1) may also be a copolymer containing polypropylene blocks.

Examples of polymer (B1) which may be mentioned are polypropylene mixtures of polypropylene and of EPDM or EPR.

Advantageously, the polymer (B1), which may be a mixture of several polymers, comprises at least 50 mol % and preferably 75 mol % of propylene.

(B2) is chosen from poly(1-butene) or copolymers of 1-butene with ethylene or another alpha-olefin having from 3 to 10 carbons, except for the propylene already mentioned in (B1).

(B3) is chosen from polystyrene or styrene copolymers. Among the copolymers, mention may be made, by way of example, of dienes having from 4 to 8 carbon atoms.

The density of (B) may be between 0.86 and 0.98 g/cm$^3$. The MFI is advantageously between 1 and 30 g/10 min. (A) and (B) may be in any respective proportions. When the coextrusion binders of the invention are used in structures comprising a polyolefin layer (F), it is preferred for (A) to be predominant in the mixture of (A) and (B) if (F) is based on polyethylene or consists essentially of polyethylene. On the other hand, when (F) is based on polypropylene or consists essentially of polypropylene, then it is preferred to have a majority of (B) in the mixture of (A) and (B).

The mixture of (A) and (B) is grafted with a functional monomer. Examples of grafted functions which may be mentioned are carboxylic acids and derivatives thereof, acid chlorides, isocyanates, oxazolines, epoxides, amines and hydroxides.

Examples of unsaturated carboxylic acids are those having 2 to 20 carbon atoms, such as acrylic acid, methacrylic acid, maleic acid, fumaric acid and itaconic acid. The functional derivatives of these acids comprise, for example, anhydrides, ester derivatives, amide derivatives, imide derivatives and metal salts (such as alkali metal salts) of unsaturated carboxylic acids.

Unsaturated dicarboxylic acids having 4 to 10 carbon atoms and their functional derivatives, particularly their anhydrides, are particularly preferred grafting monomers.

These grafting monomers comprise, for example, maleic acid, fumaric acid., itaconic acid, citraconic acid, allylsuccinic acid, 4-cyclohexene-1, 2-dicarboxylic acid, 4-methyl-4-cyclohexene-1, 2-dicarboxylic acid, bicyclo(2,2,1)hept-5-ene-2, 3-dicarboxylic acid, x-methylbicyclo (2,2,1) hept-5-ene-2,3-dicarboxylic acid, maleic anhydride, itaconic anhydride, citraconic anhydride, allylsuccinic anhydride, 4-cyclohexene-1, 2-dicarboxylic anhydride, 4-methylene-4-cyclohexene-1,2-dicarboxylic anhydride, bicyclo(2,2,1) hept-5-ene-2,3-dicarboxylic anhydride and x-methylbicyclo (2,2,1)hept-5-ene-2,2-dicarboxylic anhydride.

Examples of other grafting monomers comprise $C_1$–$C_8$ alkyl esters or glycidyl ester derivatives of unsaturated carboxylic acids such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids such as acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide and fumaric N,N-dibutylamide; imide derivatives of unsaturated carboxylic acids such as maleimide, N-butylmaleimide and N-phenylmaleimide; and metal salts of unsaturated carboxylic acids such as sodium acrylate, sodium methacrylate, potassium acrylate and potassium methacrylate.

Various known processes may be used to graft a grafting monomer onto the mixture of (A) and (B).

For example, this may be carried out by heating the polymers (A) and (B) to high temperature, about 150° to about 300° C., in the presence or absence of a solvent with or without a radical initiator. Suitable solvents which may be used in this reaction are benzene, toluene, xylene, chlorobenzene, cumene, etc. Suitable radical initiators which may be used comprise t-butyl hydroperoxide, cumene hydroperoxide, diisopropylbenzene hydroperoxide, di-t-butyl peroxide, t-butylcumyl peroxide, dicumyl peroxide, 1,3-bis (t-butylperoxyisopropyl)benzene, acetyl peroxide, benzoyl peroxide, isobutyryl peroxide, bis-3,5,5-trimethylhexanoyl peroxide and methyl ethyl ketone peroxide.

In the mixture of (A) and (B) modified by grafting, obtained in the abovementioned way, the amount of the grafting monomer may be chosen in a suitable manner, but it is preferably from 0.01 to 10%, and better still from 0.1 to 5%, relative to the weight of grafted (A) and (B).

The amount of the grafted monomer is determined by assaying the succinic functions by FTIR spectroscopy.

The cografted mixture of (A) and (B) is advantageously diluted in a polyolefin (C) or in a polymer of elastomeric nature (D) or in a mixture of (C) and (D).

The polyolefin (C) may be chosen from the polymers (A) and (B). If (A) is predominant in the mixture of (A) and (B), then (C) is advantageously chosen among the polymers (A). If (B) is predominant in the mixture (A) and (B), then (C) is advantageously chosen among the polymers (B).

(D) is a polymer of elastomeric nature, that is to say that it may be (i) an elastomer in the sense of ASTM D412, that is to say a material which may be stretched at room temperature to twice its length, maintained in this state for 5 minutes and then, when it is released, it returns to within 10% of its initial length, or (ii) a polymer which does not exactly have these above characteristics but which may be stretched and return substantially to its initial length.

Advantageously, the MFI of (D) is between 0.1 and 50.
Examples of polymers (D) which may be mentioned are:
EPR (ethylene propylene rubber) and EPDM (ethylene propylene diene)
polyethylenes obtained by metallocene catalysis and of density lower than 0.910 g/cm³.
polyethylenes of VLDPE. (very low density) type;
styrene elastomers such as SBRs (styrene-butadiene-rubber), styrene-butadiene-styrene (SBS) block copolymers, styrene-ethylene:/butene/styrene (SEBS) block copolymers and styrene-isoprene-styrene (SIS) block copolymers.
copolymers of ethylene and of at least one unsaturated carboxylic acid ester (already defined in (A))
copolymers of ethylene and of at least one vinyl ester of saturated carboxylic acid (already defined in (A)).

The amount of (C) or (D) or (C)+(D) is from 20 to 1000 parts per 10 parts of grafted (A)+(B) and preferably 60 to 500.

(C) and (D) are advantageously used. The preferred proportions are such that (D)/(C) is between 0 and 1 and more particularly between 0 and 0.5.

The binder of the invention may be manufactured by the usual means for thermoplastics by mixing in the molten state in extruders, twin-screws, BUSS, blenders or cylinder mixers. (A) and (B) may be premixed in the dry or molten state and may then be grafted in the molten state or in solution in a solvent. They may also be added separately in a device for placing in contact and blending (for example an extruder), along with the grafting monomer and the radical initiator. After grafting optionally mixing with (C) or (D).

The binder of the invention may also comprise various additives such as antioxidants, ultraviolet absorbers, antistatic agents, pigments, dyes, nucleating agents, fillers, slip agents, lubricants, flame retardants and antiblocking agents.

Examples of antioxidants are 2, 6-di-t-butyl-p-cresol, O-t-butyl-p-cresol, tetrakis [methylene-3-(3,5-di-t-butyl-4-hydroxyphenyl)propionato]methane, p-naphthylamine and para-phenylenediamine.

Examples of ultraviolet absorbers are 2,4-dihydroxybenzophenone, 2-(2'-hydroxy-3', 5'-di-t-butylphenyl)-5-chlorobenzotriazole, 2-(2-hydroxy-3-t-butyl-5-methylphenyl)-5-chlorobenzotriazole and bis(2,2',6,6')tetramethyl-4-piperidine)sebacate.

Examples of antistatic agents are lauryl diethanolamine, palmityl diethanolamine, stearyl diethanolamine, oleyl diethanolamine, behenyl diethanolamine, polyoxyethylene-alkylamines, stearyl monoglyceride and 2-hydroxy-4-n-octoxybenzophenone.

Examples of dyes comprising pigments and dyes are carbon black, titanium white, cadmium yellow and copper phthalocyanine blue.

Examples of nucleating agents are aluminium p-tert-butylbenzoate, dibenzylidenesorbitol and aluminium di-p-t-butylbenzoate.

Examples of fillers are glass fibres, carbon fibres, talc, clay, silica, calcium carbonate, barium sulphate, magnesium hydroxide, calcium hydroxide and calcium oxide.

Examples of slip agents are stearamide, oleamide and erucinamide.

Examples of lubricants are calcium stearate, zinc stearate, aluminium stearate, magnesium stearate and polyethylene wax.

Examples of flame retardants are antimony oxide, decabromobiphenyl ether and bis(3,5-dibromo-4-bromopropyloxyphenl) sulphone.

Examples of antiblocking agents are silicon dioxide and polystyrene.

The amounts of these other additives may be chosen from suitable amounts which do not adversely affect the binders of the invention. For example, relative to the total weight of (A)+(B)+(C)+(D), the suitable amounts are from about 0.01 to about 5% by weight for the antioxidants; about 0.01 to about 5% by weight for the ultraviolet absorbers; about 0.01 to about 1% by weight for the antistatic agents; about 0.01 to about 5% by weight for the dyes; about 0.01 to about 5% by weight for the nucleating agents, about 0.1 to about 60% by weight for the fillers; about 0.01 to about 1% by weight for the slip agents; about 0.01 to about 1% by weight for the lubricants; about 0.1 to about 50% by weight for the flame retardants; and about 0.01 to about 30% by weight for the antiblocking agents.

The multilayer structure of the present invention consists of the layer comprising the above binder and of a layer of oxygen-containing or nitrogen-containing polar resin, or of an inorganic oxide deposited on a polymer such as PE, PET or EVOH, or a metal layer.

Examples of polar resins preferred in the layer other than the binder are polyamide resins, a saponified copolymer of ethylene and of vinyl acetate, and polyesters.

More specifically, they comprise long-chain synthetic polyamides having structural units of the amide group in the main chain, such as PA-6, PA-6,6, PA-6,10, PA-11 and PA-12; a saponified copolymer of ethylene and of vinyl acetate having a degree of saponification of about 90 to 100 mol %, obtained by saponifying an ethylene/vinyl acetate copolymer having an ethylene content of about 15 to about 60 mol %; polyesters such as polyethylene terephthalate, polybutylene terephthalate, polyethylene naphthenate and mixtures of these resins.

The inorganic oxide layer may be silica, for example. It is deposited on a layer of PE, PET or EVOH. The structure of the invention thus respectively comprises: a layer of binder, a layer of $SiO_2$ (or $SiO_x$) and either PE or PET or EVOH.

The metal layer may be, for example, a sheet, a film or a sheet of a metal such as aluminium, iron, copper, tin or nickel, or an alloy containing at least one of these metals as main constituent. The thickness of the film or of the sheet may be conveniently chosen and it is, for example, from about 0.01 to about 0.2 mm. It is common practice to degrease the surface of the metal layer before laminating the binder of the invention on it.

It would not be departing from the scope of the invention if the above structure was combined with other layers.

The invention also relates to the above structure combined, on the binder side, with a polyolefin-based layer (F). The polyolefin (F) may be chosen from the above polymers (A) and (B).

These structures are useful for making packaging, for example rigid hollow bodies such as flexible pockets or bottles or flasks, or multilayer films.

The binders of the invention are useful for the following structures:

PE/binder/EVOH/binder/PE (PE denotes polyethylene)

PE/binder/EVOH

PE/binder/PA

PP/binder/PA

PP/binder/EVOH/binder/PP (PP denotes polypropylene).

These structures and these packages may be manufactured by coextrusion, lamination, extrusion blow-moulding, etc.

EXAMPLES

Nomenclature of the Products Used

The following products are used:

OREVAC 1: Mixture of polyolefins (based on polyethylenes) of density=0.909 g /cm$^3$, of MFI=0.8 and of melting point=117° C. grafted with maleic anhydride OREVAC 2: Polypropylene of density 0.89 g/cm$^3$, of MFI=2 melting point=151° C. grafted with maleic anhydride A1 CLEARFLEX MQ F0: Linear very low density polyethylene of MFI=12 and of density=0.895'g/cm$^3$ A2 CLEARFLEX MP D0: Linear very low density polyethylene of MFI=7 and of density 0.900 g/cm$^3$ A3 CLEARFLEX CL D0: Linear very low density polyethylene of MFI=2.7 and of density=0.900 g/cm$^3$ A4 TAFMER P048: Linear very low density polyethylene of MFI=1 and of density 0.870 g/cm$^3$ A5 EXACT 3027: Linear very low density polyethylene with metallocene catalysis, of MFI=3.5 and of density= 0.900 g/cm$^3$ A6 ENGAGE 8200: Linear very low density polyethylene with metallocene catalysis, of MFI=5 and of density 0.870 g/cm$^3$ A7 PEHD 2250 MN 53: High density polyethylene of MFI=25 and of density=0.953 g/cm$^3$ A8 LOTADER 1: Ethylene/ethyl acrylate/maleic anhydride (90.8/6/3.2) copolymer of MFI=200

A9 ENGAGE 8100: Very low density polyethylene with metallocene catalysis of MFI=1 and density=0.870 g/cm$^3$ B1 ADSYL 7130XCP: Propylene/ethylene, copolymer of density=0.89 g/cm$^3$ and of MFI=5.5 (230° C. 2.16 kg)

B2 PP 3010 GN 5: Copolymer with propylene/ethylene blocks, of density=0.902 g/cm$^3$ and of MFI=1(230° C./2.16 kg)

B3 VESTOLEN P5300: Propylene/ethylene copolymer of density=0.904 g/cm$^3$ and of MFI=12 (230° C./2.16 kg)

B4 PP 3400 MN 1: Polypropylene homopolymer of density= 0.905 g/;cm$^3$ and of MFI=40 (230° C./2.16 kg)

B5 PP 3400 MR 5: Copolymer with propylene/ethylene blocks, of density=0.902 g/cm$^3$ and of MFI=40 (230° C./2.16 kg)

B6 PP 3060 MN 5: Copolymer with Propylene/Ethylene blocks of density=0.902 g/cm$^3$ and of MFI=6 (230° C./2.16 kg)

B7 PP 3010 GN 5: Copolymer with Propylene/Ethylene blocks of density=0.902 g/cm$^3$ and of MFI=6 (230° C./2.16 kg).

C1 STAMYLEX 1026: Linear low density polyethylene of MFI=2.2 and of density=0.919 g/cm$^3$ C2 STAMYLEX 1046: Linear low density polyethylene of MFI=4.4 and of density=0.919 g/cm$^3$ C3 FLEXIRENE CL10: Linear low density polyethylene of MFI=2.5 and of density=0.918 g/cm$^3$ C4 LACQTENE LD 0304: Radical low density polyethylene of MFI=4 and of density=0.923

C5 PP 3021 GN 3: Statistic Polypropylene copolymer of density=0.902 g/cm$^3$ and of MFI=2 (230° C./2.16 kg)

D1 CLEARFLEX FF DO: Linear very low density polyethylene of MFI=0.8 and of density=0.900 g/cm$^3$ D2 EXXELOR PE 808: Ethylene/propylene copolymer containing 23% propylene, of MFI=0.17

D3 LOTRYL 1: Ethylene/methyl acrylate (71/29) copolymer 6f MFI=3

D4 CLEARFLEX CL DO : Very low density Polyethylene of MFI=2.7 and of density=0.900 g/cm$^3$.

Process for Manufacturing the Grafted Mixtures Mi

The products are grafted with maleic anhydride. They are manufactured. in a co-rotating twin-screw extruder of Werner or Leistritz type.

The extruders comprise 8 zones numbered Z1 to Z8; Z8 is located at the end of the extruder on the side of the grafted products outlet. The process is performed at the usual temperatures.

The maleic anhydride, on polymer powder, and the polymers A and B to be grafted are introduced into zone Z1 by means of two separate weight-metering devices.

The radical initiator, pure or diluted in a suitable solvent, is introduced via a metering pump into zone Z2. The temperatures in the zones Z3, Z4 and Z5 are at least sufficient for 99.9% of the radical initiator to react before zone Z6. The initiator used is 2,5-dimethyl-2,5-(di-tert-butyl)hexane peroxide (Luperox 10) (DBHP).

The residues of the radical initiator, the solvent and the unreacted maleic anhydride are degassed under vacuum in zone Z6.

The extrusion flow rate at the outlet of zone Z8 varies, according to the screw rate set, between 12 and 15 kg/h.

The extruded rod is granulated after cooling.

In Examples 1 to 27, the mixtures Mi were grafted according to the process described above. The products were characterized by their flow index (MFI under 2.16 kg at 190° C., expressed in dg/min) and the content of grafted maleic anhydride (MA) (expressed as a percentage by weight).

TABLE 1

| | | EXAMPLES | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| | | M 1 | M 2 | M 3 | M 4 | M 5 | M 6 | M 7 | M 8 | M 9 | M 10 | M 11 | M 12 | M 13 | M 14 |
| A1 | CLEARFLEX MQ F0 | | | | | | | | | | | | | | |
| A2 | CLEARFLEX MP D0 | | | | | | | | | | | | | | |
| A3 | CLEARFLEX CL D0 | | | | | | | 100 | 75 | 50 | | | | | |
| A4 | TAFMER P048 | | | | | | | | | | 100 | 80 | 50 | 80 | 50 |
| A5 | EXACT 1027 | 100 | 75 | 50 | | | | | | | | | | | |
| A6 | ENGAGE 8200 | | | | 100 | 75 | 50 | | | | | | | | |
| A7 | PEHD 2250 MIN 53 | | | | | | | | | | | | | | |
| A8 | LOTADER 1 | | | | | | | | | | | | | | |
| B1 | ADSYL 7130XCP | | | | | | | | | | | | | | |
| B2 | PP 3010 GN 5 | | 25 | 50 | | 25 | 50 | | 25 | 50 | | 20 | 50 | | |
| B3 | VESTOLEN P5300 | | | | | | | | | | | | | | |
| B4 | PP 3400 MN 1 | | | | | | | | | | | | | | |
| B5 | PP 3400 MR 5 | | | | | | | | | | | | | 20 | 50 |
| | DHBP % | 0.2 | 0.2 | 0.2 | 0.2 | 0.2 | 0.2 | 0.2 | 0.2 | 0.2 | 0.3 | 0.3 | 0.3 | 0.3 | 0.3 |
| | AM % | 3 | 3 | 3 | 3 | 3 | 3 | 3 | 3 | 3 | 4 | 4 | 4 | 4 | 4 |
| | AM grafted % | 1.5 | 1.6 | 1.4 | 2 | 2.1 | 1.8 | 1.8 | 1.7 | 1.5 | 2.5 | 2.7 | 3 | 2.1 | 2.3 |
| | MFI (190° C.; 2.16 kg) | 0 | 0.1 | 0.7 | 0 | 0.7 | 1.7 | 0 | 0.15 | 1.65 | 0 | 0.1 | 0.9 | 0.1 | 3.6 |

| | | EXAMPLES | | | | | | | | | | | | |
|---|---|---|---|---|---|---|---|---|---|---|---|---|---|---|
| | | 15 | 16 | 17 | 18 | 19 | 20 | 21 | 22 | 23 | 24 | 25 | 26 | 27 |
| | | M 15 | M 16 | M 17 | M 18 | M 19 | M 20 | M 21 | M 22 | M 23 | M 24 | M 25 | M 26 | M 27 |
| A1 | CLEARFLEX MQ F0 | | | 80 | 50 | 100 | 90 | 80 | 70 | | | | | |
| A2 | CLEARFLEX MP D0 | | | | | | | | | 100 | 80 | | | |
| A3 | CLEARFLEX CL D0 | | | | | | | | | | | | | |
| A4 | TAFMER P048 | | | | | | | | | | | | | |
| A5 | EXACT 1027 | | | | | | | | | | | | | |
| A6 | ENGAGE 8200 | | | | | 100 | 75 | 50 | | | | | | |
| A7 | PEHD 2250 MIN 53 | 100 | 80 | | | | | | | | | | | |
| A8 | LOTADER 1 | | | | | | | | | | | 100 | 80 | 80 |
| B1 | ADSYL 7130XCP | | 20 | | | | | | | | | | 20 | 20 |
| B2 | PP 3010 GN 5 | | | 20 | 50 | | | | | | | | | |
| B3 | VESTOLEN P5300 | | | | | | 10 | 20 | 30 | | | | | |
| B4 | PP 3400 MN 1 | | | | | | | | | | 20 | | | |
| B5 | PP 3400 MR 5 | | | | | | | | | | | | | |
| | DHBP % | 0.3 | 0.3 | 0.3 | 0.3 | 0.3 | 0.33 | 0.3 | 0.3 | 0.3 | 0.2 | 0.15 | 0.15 | 0.3 |
| | AM % | 4 | 4 | 4 | 4 | 5 | 5 | 5 | 5 | 3 | 3 | 1 | 2 | 4 |
| | AM grafted % | 1.6 | 1.5 | 2.15 | 2.6 | 2.7 | 2.6 | 3.2 | 2.6 | 2.8 | 2 | 0.8 | 1.4 | 2 |
| | MFI (190° C.; 2.16 kg) | 0.4 | 2.9 | 0.2 | 3 | 0 | 0 | 0.1 | 0.5 | 0 | 0.3 | 14 | 80 | 10 |

Process for Manufacturing the Binders Li,j: (Li,j is Manufacture from Mi)

The binders Li,j are manufactured in a co-rotating twin-screw extruder of the Werner or Leistritz type, having 8 zones (Z1 to Z8) as above and under the usual temperature conditions.

The grafted mixture M i and the polymers C and D to be mixed are introduced into Z1 by means of two separate weight-metering devices. The granules of polymers C and D were dry-mixed beforehand in a slow barrel mixer, in the desired proportions. The temperatures in the zones are least sufficient to ensure melting of the various products and to allow good mixing of the molten mass.

The extrusion flow rate at the outlet of zone Z8 varies, according to the screw rate set, between 12 and 15 kg/h.

The extruded rod is granulated after cooling. The products are characterized by their flow index (MFI under 2.16 kg at 190° C., expressed in dg/min).

The binders Li,j used in Examples 28 to 47 were manufactured according to the process described above. Their characteristics are reported in Table 2.

TABLE 2

| | | EXAMPLES | | | | | | | | | |
|---|---|---|---|---|---|---|---|---|---|---|---|
| | | 28 | 29 | 30 | 31 | 32 | 33 | 34 | 35 | 36 | 37 |
| | BINDER Li, j | control | control | L 2.1 | L 3.1 | L 5.1 | L 5.2 | L 5.3 | L 5.4 | L 6.1 | L 8.1 |
| | MIXTURE M i | | | 10 | 10 | 10 | 2.5 | 10 | 10 | 10 | 10 |
| | OREVAC 1 | 100 | 100 | | | | | | | | |
| C1 | STAMYLEX 1026 | | | 67.5 | 67.5 | 67.5 | | | | 67.5 | 67.5 |
| C2 | STAMYLEX 1046 | | | | | | 73.1 | 67.5 | 67.5 | | |
| C3 | FLEXIRENE CL10 | | | | | | | | | | |
| C4 | LACQTENE LD 0304 | | | | | | | | | | |
| D1 | CLEARFLEX FF D0 | | | | | | | 22.5 | | | |

TABLE 2-continued

|  |  |  |  |  |  |  |  |  |  |  |
|---|---|---|---|---|---|---|---|---|---|---|
| D2 | EXXELOR PE 808 |  |  | 22.5 | 22.5 | 22.5 | 24.4 |  | 22.5 | 22.5 |
| D3 | LOTRYL 1 |  |  |  |  |  |  | 22.5 |  |  |
|  | MFI (190° C., 2.16 kg) | 0.8 | 0.8 | 1 | 1 | 1 | 1.8 | 2.3 | 3.8 | 1.2 | 1.2 |
| Binder evaluated on ERWEPA | ADHESION after extrusion (N/15 mm) | 5 |  | 2.4 | 3.3 | 5 | 2.5 | 5.9 | 5 | 3.4 | 3.1 |
|  | ADHESION 8 days after extrusion (N/15 mm) | 7 |  | 5.2 | 5.3 | 6.5 | 3.3 | 7.8 | 6 | 5.8 | 5.5 |
| Binder evaluated on BARMAG | ADHESION after extrusion (N/15 mm) |  | 8.5 |  |  |  |  |  |  |  |  |
|  | ADHESION 8 days after extrusion (N/15 mm) |  | 8.5 |  |  |  |  |  |  |  |  |

|  |  | EXAMPLES | | | | | | | | | |
|---|---|---|---|---|---|---|---|---|---|---|---|
|  |  | 38 | 39 | 40 | 41 | 42 | 43 | 44 | 45 | 46 | 47 |
|  | BINDER Li, j | L 9.1 | L 12.1 | L 14.1 | L15.1 | L15.2 | L18.1 | L23.1 | L26.1 | L26.1 | L27.1 |
|  | MIXTURE M i | 10 | 10 | 10 | 10 | 10 | 10 | 10 | 10 | 10 | 10 |
|  | OREVAC 1 |  |  |  |  |  |  |  |  |  |  |
| C1 | STAMYLEX 1026 | 67.5 | 67.5 | 67.5 | 67.5 |  | 67.5 | 67.5 |  |  |  |
| C2 | STAMYLEX 1046 |  |  |  |  |  |  |  | 67.5 | 67.5 |  |
| C3 | FLEXIRENE CL10 |  |  |  |  |  |  |  |  |  | 67.5 |
| C4 | LACQTENE LD 0304 |  |  |  |  | 67.5 |  |  |  |  |  |
| D1 | CLEARFLEX FF D0 |  |  |  |  |  |  |  |  |  |  |
| D2 | EXXELOR PE 808 | 22.5 | 22.5 | 23 | 22.5 | 22.5 | 22.5 | 22.5 | 22.5 | 22.5 | 22.5 |
| D3 | LOTRYL 1 |  |  |  |  |  |  |  |  |  |  |
|  | MFI (190° C., 2.16 kg) | 1.1 | 1.2 | 1.1 | 1 | 1.4 | 0.8 | 0.9 | 1.9 | 1.9 | 1.4 |
| Binder evaluated on ERWEPA | ADHESION after extrusion (N/15 mm) | 1.9 | 1.9 | 2.8 |  | 2.6 | 3.3 | 2.7 | 3.9 |  | 2.3 |
|  | ADHESION 8 days after extrusion (N/15 mm) | 4.1 | 5.6 | 5.9 |  | 3.9 | 5.5 | 4.3 | 6.5 |  | 4.7 |
| Binder evaluated on BARMAG | ADHESION after extrusion (N/15 mm) |  |  |  | 6.9 |  |  |  |  | 6.8 |  |
|  | ADHESION 8 days after extrusion (N/15 mm) |  |  |  | 7 |  |  |  |  | 6 |  |

Use and Evaluation of the Binders

In Examples 28, 30 to 40, 42 to 45 and 47, the binders L 2.1, L 3.1, L 5.1, L 5.2, L 5.3, L 5.4, L 6.1, L 8.1, L 9.1, L 12.1, L 14.1, L 15.1, L 15.2, L 18.1, L 23.1, L 26.1 and L 27.1 were evaluated as binders of the PE/binder/EVOH/binder/ PE five-layer system, compared with a standard binder for this type of application (OREVAC 1). The PE is PEBD 1020 FN 24 and the EVOH is SOARNOL ET. The five-layer structure was prepared on an ERWEPA extruder assembly as a cast film under the usual conditions for extruding this type of structure, with the following, thicknesses 20/10/10/10/20 expressed in μm.

The adhesion was evaluated by peeling with a free peeling angle at a crossing rate of 200 mm/min on precut test pieces 15 mm wide and 20 mm long. The adhesion is measured immediately after extrusion and 8 days later (Table 2).

In Examples 29, 41 and 46, the binders L 15.1 and L 26.1 were evaluated as binders of the PE/binder/EVOH 3-layer system, compared with a standard binder for this type of application (OREVAC 1). The PE is PEBD 1020 FN 24 and the EVOH is SOARNOL ET. The three-layer structure was prepared on a BARMAG extruder assembly as a blown film under the usual conditions for extruding this type of structure, with the following thicknesses 40/10/20 expressed in μm.

The adhesion was evaluated by peeling with a free peeling angle at a crossing rate of 200 mm/min on precut test pieces 15 mm wide and 20 mm long. The adhesion is measured immediately after extrusion and 8 days later (Table 2).

Process For Manufacturing the Grafted Mixtures Mi

In examples 48 and 49 mixtures Mi were grafted according to the process described for examples 1 to 27.

|  |  | EXAMPLES | |
|---|---|---|---|
|  |  | 48 | 49 |
|  |  | M 48 | M 49 |
| A1 | CLEARFLEX MQ F0 |  |  |
| A2 | CLEARFLEX MP D0 |  |  |
| A3 | CLEARFLEX CL D0 |  |  |
| A4 | TAFMER P048 |  |  |
| A5 | EXACT 3027 |  |  |
| A6 | ENGAGE 8200 |  |  |
| A7 | PEHD 2250 MIN 53 |  |  |
| A8 | LOTADER 1 |  |  |
| A9 | ENGAGE 8100 | 30 | 20 |
| B1 | ADSYL 7130XCP |  |  |
| B2 | PP 3010 GN 5 |  |  |
| B3 | VESTOLEN P5300 |  |  |
| B4 | PP 3400 MN 1 |  |  |
| B5 | PP 3400 MR 5 |  |  |
| B6 | PP 3060 MN 5 | 70 | 80 |
| B7 | PP 3010 GN 5 |  |  |
|  | DHBP % | 0.35 | 0.6 |
|  | AM % | 4 | 5 |
|  | AM grafted % | 2.6 | 2.7 |
|  | MFI (190° C.; 2.16 kg) | 16 | 67 |

In examples 53, 54 and 55 mixtures Mi were grafted according the process described for examples 1 to 27 but with glycidyl methacrylate (GMA) instead of maleic anhydride. GMA pure or diluted in a suitable solvent is introduced into zone Z2 by means of a weight metering device.

|  |  | EXAMPLES | | |
|---|---|---|---|---|
|  |  | 53<br>M 53 | 54<br>M 54 | 55<br>M 55 |
| A1 | CLEARFLEX MQ F0 |  |  |  |
| A2 | CLEARFLEX MP D0 |  |  |  |
| A3 | CLEARFLEX CL D0 |  |  |  |
| A4 | TAFMER P048 |  |  |  |
| A5 | EXACT 3027 |  |  |  |
| A6 | ENGAGE 8200 |  | 20 | 30 |
| A7 | PEHD 2250 MIN 53 |  |  |  |
| A8 | LOTADER 1 |  |  |  |
| A9 | ENGAGE 8100 |  |  |  |
| B1 | ADSYL 7130XCP |  |  |  |
| B2 | PP 3010 GN 5 |  |  |  |
| B3 | VESTOLEN P5300 |  |  |  |
| B4 | PP 3400 MN 1 |  |  |  |
| B5 | PP 3400 MR 5 |  |  |  |
| B6 | PP 3060 MN 5 | 100 | 80 | 70 |
| B7 | PP 3010 GN 5 |  |  |  |
|  | DHBP % | 0.5 | 0.5 | 0.5 |
|  | GMA % | 3 | 3 | 3 |
|  | GMA grafted % | 0.56 | 1 | 1.2 |
|  | MFI (230° C.; 2.16 kg) | 69 | 33 | 20 |

GMA: glycidyle methacrylate

Process for Manufacturing the Binders Li,j Li,j is Manufactured from Mi

The binders Li,j used in examples 50 to 52 were manufactured according to the process described for examples 28 to 47. Their characteristics are reported in table 3.

TABLE 3

|  | EXAMPLES | 50 | 51 | 52 |
|---|---|---|---|---|
|  | BINDER Li, j | Witness | L 48.1 | L 49.1 |
|  | MIXTURE M i |  | 16 | 15 |
|  | OREVAC 1 |  |  |  |
|  | OREVAC 2 | 100 |  |  |
| C1 | STAMYLEX 1026 |  |  |  |
| C2 | STAMYLEX 1046 |  |  |  |
| C3 | FLEXIRENE CL10 |  |  |  |
| C4 | LACQTENE LD 0304 |  |  |  |
| C5 | PP 3021 GN 5 |  | 65 | 65 |
| D1 | CLEARFLEX FF D0 |  |  |  |
| D2 | EXXELOR PE 808 |  |  |  |
| D3 | LOTRYL 1 |  |  |  |
| D4 | CLEARFLEX CL D0 |  | 20 | 20 |
|  | MFI (230° C.; 216 kg) | 2 | 2.3 | 2.5 |
|  | Binder evaluated on ERWEPA |  |  |  |
|  | ADHESION after extrusion (N/15 mm) |  |  |  |
|  | ADHESION 8 days after extrusion (N/15 mm) |  |  |  |
|  | Binder evaluated on BARMAG |  |  |  |
|  | ADHESION after extrusion (N/15 mm) | 2.9 | 2.3 | 4 |
|  | ADHESION 8 days after extrusion (N/15 mm) | 3.8 | 5.3 | 5.3 |

Use and Evalution of the Binders

In Examples 50, 51 and 52, the binders:L 48,1 and L 49,1 were evaluated as binders of the PP/binder/EVOH 3-layer system, compared with a standard binder (OREVAC 2). The PP is PP 3021 GN 3 and EVOH is SOARNOL ET. The three-layer structure was prepared, on a BARMAG extruder assembly as a blown film under the usual conditions for extruding this type of structure with the following thicknesses 40/10/20 expressed in $\mu$m.

The adhesion was evaluated by peeling with a free peeling angle at a crossing rate of 200 mm/min on precut test pieces 15 mm wide and 20 mm long.

The adhesion is measured immediately after extrusion and 8 days later.

Although the invention has been described in conjunction with specific embodiments, it is evident that many alternatives and variations. will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Mixture which is useful as a coextrusion binder, comprising:
   at least (A) one polyethylene or one ethylene copolymer,
   at least (B) selected from (B1) polypropylene or a propylene copolymer, (B2) poly(1-butene) homo- or copolymer, and (B3) polystyrene homo- or copolymer, the mixture of (A) and (B) being grafted with a functional monomer, wherein the functional monomer is selected from the group consisting of acid chlorides, isocyanates, oxazolines, epoxides, amines, hydroxides, and carboxylic acids and derivatives thereof, the carboxylic acids being selected from the group consisting of acrylic acid, fumaric acid and unsaturated dicarboxylic acids having from 5 to 20 carbon atoms.

2. Mixture according to claim 1, wherein (A) comprises at least 50 mol % of ethylene.

3. Mixture according to claim 1, wherein (B) comprises at least 50 mol % of propylene.

4. Mixture which is useful as a coextrusion binder, comprising:
   at least (A) one polyethylene or one ethylene copolymer,
   at least (B) selected from (B1) polypropylene or a propylene copolymer, (B2) poly(1-butene) homo- or copolymer, and (B3) polystyrene homo- or copolymer, the mixture of (A) and (B) being grafted with a functional monomer, this grafted mixture itself being diluted in at least one polyolefin (C) or in at least one polymer (D) of elastomeric nature or in a mixture of (C) and (D).

5. Mixture according to claim 4, wherein the functional monomer is selected from carboxylic acids and derivatives thereof, acid chlorides, isocyanates, oxazolines epoxides, amines or hydroxides.

6. Mixture according to claim 4, wherein (C) is selected from polymers (A) and (B).

7. Mixture according to claim 4, wherein the amount of (C) or (D) or of (C) and (D) is from 20 to 1000 parts per 10 parts of the grafted mixture of (A) and (B).

8. Mixture according to claim 4, wherein the proportions of (C) and (D) are such that (D)/(C) by weight is between 0 and 1.

9. Multilayer structure comprising:
   a layer comprising a binder consisting of a mixture comprising at least (A) one polyethylene or one ethylene copolymer, and at least (B) selected from (B1) polypropylene or a propylene copolymer, (B2) poly(1- butene) homo- or copolymer, and (B3) polystyrene homo- or copolymer, the mixture of (A) and (B) being grafted with a functional monomer, this grafted mixture itself being diluted in at least one polyolefin (C) or in at least one polymer (D) of elastomeric nature or in a mixture of (C) and (D); and, directly attached thereto, a layer of nitrogen-containing or oxygen-containing polar resin optionally a layer (E) of a polyamide resin, of a saponified copolymer of ethylene and of vinyl acetate, of a polyester resin or of an inorganic oxide deposited on a polymer optionally polyethylene, polyethylene terephthalate or EVOH, or alternatively a metal layer.

10. Structure according to claim 9 comprising a polyolefin-based layer (F) directly attached to the layer of binder.

11. Structure according to claim 10, wherein (F) consists essentially of a polyethylene and (A) is predominant in the mixture (A)+(B).

12. Structure according to claim 10, wherein (F) consists essentially of polypropylene and (B) is predominant in the mixture (A)+(B).

13. Mixture according to claim 2, wherein the amount of (A) is 75 mol %.

14. Mixture according to claim 3, wherein the amount of (B) is 75 mol %.

15. Mixture according to claim 5, wherein the monomer is an unsaturated dicarboxylic acid anhydride.

16. Mixture according to claim 7, wherein the amount of (C) or (D) or of (C) and (D) is 60 to 500 parts.

17. Mixture according to claim 8, wherein the amount is between 0 and 0.5.

18. Mixture which is useful as a coextrusion binder, comprising:

at least (A) one polyethylene or one ethylene copolymer, at least (B) selected from (B1) polypropylene or a propylene copolymer, (B2) poly(1-butene) homo- or copolymer, and (B3) polystyrene homo- or copolymer, the mixture of (A) and (B) being grafted with a functional monomer, wherein the functional monomer is selected from the group consisting of acid chlorides, isocyanates, oxazolines, epoxides, amines, hydroxides, and carboxylic acids and derivatives thereof, the carboxylic acids being selected from the group consisting of acrylic acid, fumaric acid and unsaturated dicarboxylic acids having from 5 to 20 carbon atoms, wherein (A) comprises 75 mol % of ethylene; and wherein (B) comprises 75 mol % of propylene.

* * * * *